(12) United States Patent
Kim et al.

(10) Patent No.: US 9,076,362 B2
(45) Date of Patent: Jul. 7, 2015

(54) DISPLAY SUBSTRATE AND METHOD OF MANUFACTURING A MOTHERBOARD FOR THE SAME

(75) Inventors: Hyun-Young Kim, Suwon-si (KR); Chun-Gi You, Hwaseong-si (KR); Jae-Bok Lee, Seoul (KR); Kwan-Wook Jung, Suwon-si (KR); Hyung-Don Na, Seoul (KR); Seung-Gyu Tae, Suwon-si (KR); Jung-Yun Kim, Gunpo-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 1766 days.

(21) Appl. No.: 11/858,301

(22) Filed: Sep. 20, 2007

(65) Prior Publication Data
US 2008/0074137 A1    Mar. 27, 2008

(30) Foreign Application Priority Data

Sep. 22, 2006 (KR) .................. 10-2006-0092034
Apr. 20, 2007 (KR) .................. 10-2007-0038660

(51) Int. Cl.
| G02F 1/136 | (2006.01) |
| G09G 3/00 | (2006.01) |
| G02F 1/1345 | (2006.01) |
| G02F 1/1362 | (2006.01) |
| G09G 3/36 | (2006.01) |

(52) U.S. Cl.
CPC .......... *G09G 3/006* (2013.01); *G02F 1/13458* (2013.01); *G02F 1/136204* (2013.01); *G02F 2001/136254* (2013.01); *G09G 3/3648* (2013.01)

(58) Field of Classification Search
USPC .................................................. 349/40, 152
See application file for complete search history.

(56) References Cited

U.S. PATENT DOCUMENTS

| 6,104,449 A * | 8/2000 | Takahashi et al. ............. 349/40 |
| 6,774,957 B2 * | 8/2004 | Jinno et al. .................... 349/40 |
| 6,924,852 B2 * | 8/2005 | Choi .............................. 349/40 |
| 7,466,370 B2 * | 12/2008 | Chae et al. .................... 349/40 |
| 7,545,473 B2 * | 6/2009 | Ueda et al. .................. 349/149 |
| 7,567,324 B2 * | 7/2009 | Lee et al. ..................... 349/139 |
| 7,724,314 B2 * | 5/2010 | Tanaka et al. ................. 349/54 |
| 2007/0030408 A1 * | 2/2007 | Lin et al. ........................ 349/40 |

FOREIGN PATENT DOCUMENTS

| JP | 11-142888 | 5/1999 |
| JP | 2002-099224 | 4/2002 |
| JP | 2003-121871 | 4/2003 |
| KR | 1020030082649 | 10/2003 |
| KR | 1020060013267 | 2/2006 |

* cited by examiner

Primary Examiner — James Dudek
(74) Attorney, Agent, or Firm — F. Chau & Associates, LLC

(57) ABSTRACT

A display substrate includes a signal line, a test switch, a test pad, and a first electrostatic dispersion line. The signal line is formed in the display area of a base substrate. The test switch is formed in a peripheral area of the base substrate surrounding the display area. The test switch applies a test signal to the signal line. The test pad is electrically connected to the test switch and receives the test signal. The first electrostatic dispersion line is extended from the test pad to an end of the base substrate.

19 Claims, 10 Drawing Sheets

DISPLAY SUBSTRATE AND METHOD OF MANUFACTURING A MOTHERBOARD FOR THE SAME

CROSS-REFERENCE TO RELATED APPLICATION

This application claims priority under 35 U.S.C. §119 to Korean Patent Application No. 2006-92034, filed on Sep. 22, 2006, and No. 2007-38660, filed on Apr. 20, 2007, in the Korean Intellectual Property Office (KIPO), the contents of which are herein incorporated by reference in their entirety.

BACKGROUND OF THE INVENTION

1. Technical Field

The present invention relates to a display substrate and a method of manufacturing a motherboard for the display substrate.

2. Discussion of the Related Art

As part of a process in the manufacture of a liquid crystal display, a visual inspection (VI) or a gross test (GT) is performed before integrated circuits are mounted on a liquid crystal display panel. The VI or the GT inspects a pixel voltage applied to a pixel electrode of an array substrate. The VI or the GT inspects errors before a process of manufacturing the liquid crystal display panel is completed so that manufacturing costs are reduced and productivity is improved.

During VI, a test signal line is separated from a gate line and a source line when it appears that there are no errors in the pixel voltage. The test signal line is separated from the gate line and the source line through a diamond cutting process in which the substrate including the test signal line formed thereon is cut with a diamond cutter or a laser trimming (L/T) process. In the L/T method additional processes are required to manufacture the display substrate. In the diamond cutting method, a pollutant may be generated during the diamond cutting process and conductor lines exposed due to cutting may corrode. The VI can be performed using a test switch and a test pad applying the test signal to the test switch to eliminate the L/T process.

During the manufacture of the liquid crystal display apparatus, static electricity may be may be present and may cause a short circuit between conductors or switching elements. For example, static electricity is easily generated from an electrical short point or a test pad. Various methods and devices have been proposed to prevent static electricity but additional manufacturing costs and processes may be incurred.

SUMMARY OF THE INVENTION

A display substrate according to an exemplary embodiment of the present invention includes a signal line, a test switch, a test pad, and a first electrostatic dispersion line. The signal line is formed in a display area of a base substrate. The test switch is formed in a peripheral area of the base substrate surrounding the display area. The test switch applies a test signal to the signal line. The test pad is electrically connected to the test switch and receives the test signal. The first electrostatic dispersion line is extended from the test pad to an end of the base substrate.

A method of manufacturing a base motherboard for a display substrate according to an exemplary embodiment of the present invention is as follows. An array layer is formed on a base motherboard. The array layer includes a signal line, a test signal line, and a test switching element. The signal line is formed on a display area of each of array regions of the base motherboard. The test signal line is formed on a peripheral area of each of the array regions and electrically connected to the signal line. The test switching element is connected to the test signal line. A transparent electrode layer is formed on the base motherboard having the array layer formed thereon. The transparent electrode layer is patterned to form a transparent electrode pattern. The transparent electrode pattern includes an electrical shorting bar, a test pad electrode and a first electrostatic dispersion line. The electrical shorting bar is formed between adjacent array areas. The test pad electrode is connected to one end of the test signal line. The first electrostatic dispersion line connects the test pad electrode to the electrical shorting bar.

According to the display substrate and the method of manufacturing the motherboard for the display substrate, the first electrostatic dispersion lines may connect the test pad electrode of the test pad to the electrical shorting bar so that the electrical shorting bar may disperse the electric charges inflowing from the test pad into a large area to prevent static electricity from being generated. Therefore, the motherboard for the display substrate may be prevented from being damaged by the static electricity so that the reliability of products may be improved and manufacturing processes may be simplified.

BRIEF DESCRIPTION OF THE DRAWINGS

Exemplary embodiments of the present invention can be understood in more detail from the following descriptions taken in conjunction with the accompanying drawings, in which.

DESCRIPTION OF THE EMBODIMENTS

The invention is described more fully hereinafter with reference to the accompanying drawings, in which embodiments of the invention are shown. This invention may, however, be embodied in many different forms and should not be construed as limited to the embodiments set forth herein.

Figure 1:
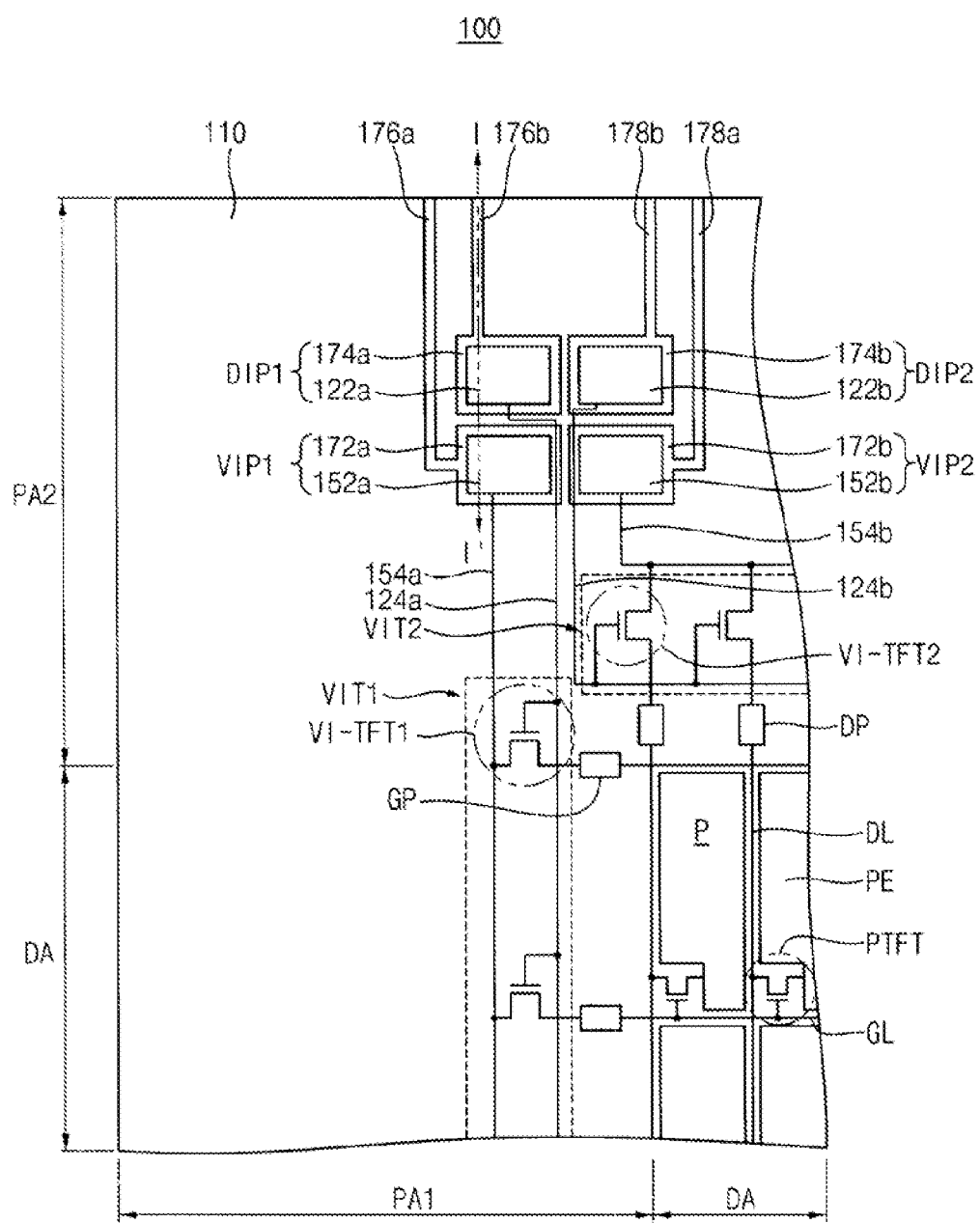
FIG. 1 is a plan view illustrating a display substrate according to an exemplary embodiment of the present invention.
Figure 2:
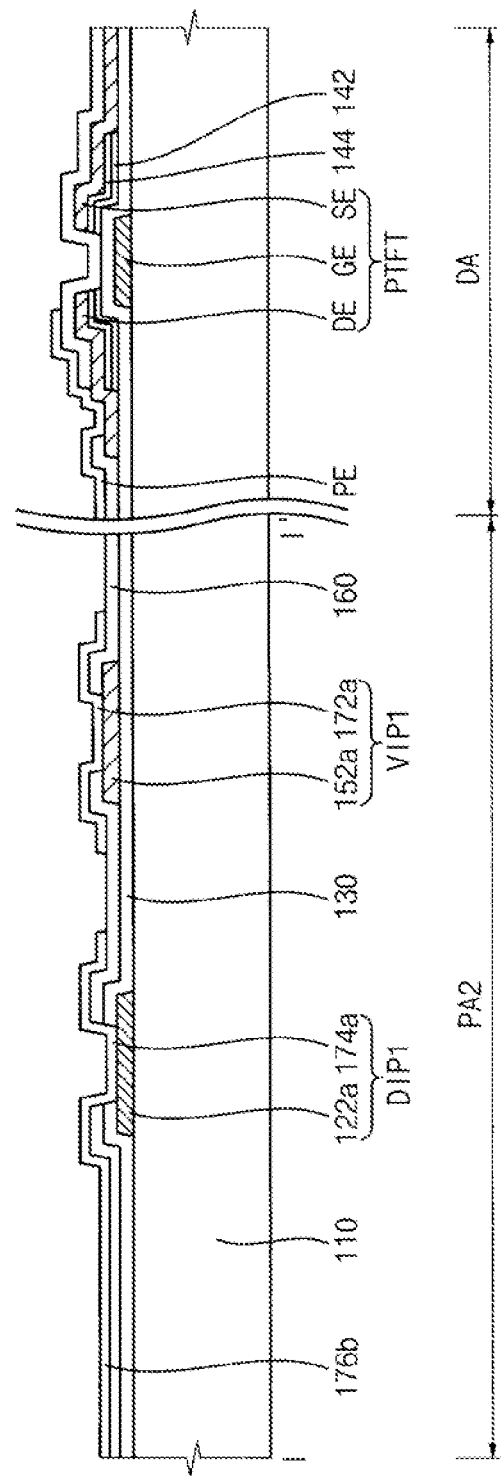
FIG. 2 is a cross-sectional view taken along a line I-I' shown in FIG. 1.

FIG. 1 is a plan view illustrating a display substrate according to an exemplary embodiment of the present invention. FIG. 2 is a cross-sectional view taken along a line I-I' shown in FIG. 1.

Referring to FIGS. 1 and 2, a display substrate 100 according to an exemplary embodiment of the present invention includes a base substrate 110. The base substrate 110 includes a display area DA, a first peripheral area PA1 and a second peripheral area PA2. The display area DA includes a plurality of in pixel areas P. The first and second peripheral areas PA1 and PA2 surround the display area DA.

A gate line GL, a data line DL, a pixel switching element PTFT and a pixel electrode are formed in the display area DA. The gate line GL is extended in a first direction, and a plurality of gate lines GLs are arranged in parallel with a second direction substantially perpendicular to the first direction. The data line DL is extended in the second direction, and a plurality of data lines DLs are arranged in parallel with the first direction. The gate line GL crosses the data line DL.

The pixel switching element PTFT includes a gate electrode GE, a source electrode SE and a drain electrode DE. The gate electrode GE is connected to the gate line GL. A gate insulating layer 130 is formed on the gate electrode GE. A semiconductor layer 142 and an ohmic contact layer 144 are sequentially formed on the gate insulating layer 130. The source electrode SE is connected to the data line DL. The drain electrode DE is spaced apart from the source electrode SE. A passivation layer 160 is formed on the source electrode SE and the drain electrode DE. A contact hole formed through the passivation layer 160 exposes a portion of the drain electrode DE. The pixel electrode PE is electrically connected to the pixel switching element PTFT. The pixel electrode PE is formed on the passivation layer 160. The pixel electrode PE is electrically connected to the drain electrode DE through the contact hole. The pixel electrode PE may include a transparent conductive material. For example, the pixel electrode may include indium tin oxide (ITO) or indium zinc oxide (IZO).

A gate pad GP, a first test switch VIT1, a first test signal line 154a, a first driving signal line 124a, a first test pad VIP1 and a first driving pad DIP1 are formed in the first peripheral area PA1. The gate pad GP is connected to the gate line GL.

A data pad DP, a second test switch VIT2, a second test signal line 154b, a second driving signal line 124b, a second test pad VIP2, and a second driving pad DIP2 are formed in the second peripheral area PA2. The data pad DP is connected to the data line DL.

The first test switch VIT1 includes a plurality of first test switching elements VI-TFT1. Each of the first switching elements VI-TFT1 is connected to the first test signal line 154a and the first driving signal line 124a. The first test pad VIP1 is connected to the first test signal line 154a. The first driving pad DIP1 is connected to the first driving signal line 124a.

The first test switching element VI-TFT1 receives a gate test signal from the first test signal line 154a. The first test switching element VI-TFT1 further receives a driving signal from the first driving signal line 124a. The first test switching element VI-TFT1 may apply the gate test signal to the gate line GL of the display area DA. In an exemplary embodiment, the first test signal line 154a may be formed from a source metal layer from which the data line DL is formed. The first driving signal line 124a may be formed from a gate metal layer from which the gate line GL is formed.

The first test pad VIP1 includes a first test electrode 152a and a second test pad electrode 172a. The first test electrode 152a is connected to the first test signal line 154a. The first test pad electrode 172a is electrically connected to the first test electrode 152a. The first test electrode 152a is formed from the source metal layer. The first test pad electrode 172a may include the same material as the pixel electrode PE. The pixel electrode PE may include, for example, a transparent material.

The first driving pad DIP1 includes a first driving electrode 122a and a first driving pad electrode 174a. The first driving electrode 122a is connected to the first driving signal line 124a. The first driving pad electrode 174a is electrically connected to the first driving electrode 122a. The first driving electrode 122a may be formed from the gate metal layer from which the first driving signal line 124a is formed. The first driving pad electrode 174a may include the same material as the first test pad electrode 172a. The first test pad electrode 172a may include, for example, a transparent material.

The second test switch VIT2 includes a plurality of second test switching elements VI-TFT2. Each of the second test switching elements VI-TFT2 is connected to the second test signal line 154b and the second driving signal line 124b. The second test switching element VI-TFT2 may apply a data test signal to the data line DL formed in the display area DA.

The second test pad VIP2 is connected to the second test signal line 154b. The second test pad VIP2 includes a second test electrode 152b and a second test pad electrode 172b. The second test electrode 152b is connected to the second test signal line 154b. The second test pad electrode 172b is electrically in connected to the second test electrode 152b. In an exemplary embodiments the second test signal line 154b may be formed from the source metal layer.

The second driving pad DIP2 is connected to the second driving signal line 124b. The second driving pad DIP2 includes a second driving electrode 122b and a second driving pad electrode 174b. The second driving electrode 122b is connected to the second driving signal line 124b. The second driving pad electrode 174b is electrically connected to the second driving electrode 122b. In an exemplary embodiment the second driving signal line 124b may be formed from the gate metal layer.

In a visual inspection (VI) process for inspecting a voltage applied to the pixel electrode PE in the display area DA, the first and second test pads VIP1 and VIP2 respectively apply the gate test signal and the data test signal to the gate line GL and the data line DL. The gate test signal is applied into the display area DA via the first test switching element VI-TFT1. The data test signal is applied into the display area DA via the second switching element VI-TFT2. Errors of the gate and data lines and switching elements may be inspected by the gate test signal and the data test signal applied into the display area DA. After the VI process is performed, the first and second test switches VIT1 and VIT2 are electrically blocked when an off-voltage is applied to the first and second driving signal lines 124a and 124b through the first and second driving pad DIP1 and DIP2. The test switching elements of the first and second test switches VIT1 and VIT2 remain off when the display apparatus including the display substrate 100 is operated. Therefore, the test switching elements of the first and second test switches VIT1 and VIT2 are electrically blocked to be electrically opened.

First electrostatic dispersion lines 176a and 178a and second electrostatic dispersion lines 176b and 178b are formed in the first and second peripheral areas PA1 and PA2. The first electrostatic dispersion lines 176a and 178a are connected to the first and second test pads VIP1 and VIP2. The second electrostatic dispersion lines 176b and 178b are connected to the first and second driving pads DIP1 and DIP2.

A first line of the first electrostatic dispersion lines 176a is extended from the first test pad VIP1 to an end of the base substrate 100 and a second line of the first electrostatic dispersion lines 178a is extended from the second test pad VIP2 to the end of the base substrate 110. The first line of the first electrostatic dispersion lines 176a is connected to the first test pad electrode 172a. The second line of the first electrostatic dispersion lines 178a is connected to the second test pad electrode 172b. The first electrostatic dispersion lines 176a and 178a may include the same material as the first and second test pad electrodes 172a and 172b. The first and second test pad electrodes 172a and 172b may include, for example, a transparent material. The first electrostatic dispersion lines 176a and 178a are spaced apart from each other.

A first line of the second electrostatic dispersion lines 176b is extended from the first driving pad DIP1 to the end of the base substrate 110. A second line of the second electro static dispersion lines 178b is extended from the second driving pad DIP2 to the end of the base substrate 110. The first line of the second electrostatic dispersion lines 176b is connected to the first driving pad electrode 174a. The second line of the second electrostatic dispersion lines 178b is connected to the second driving pad electrode 174b. The second electrostatic dispersion lines 176b and 178b include a same material as the first and second driving pad electrodes 174a and 174b. The first and second driving pad electrodes 174a and 174b may include for example, a transparent material. The second electrostatic dispersion lines 176b and 178b are spaced apart from each other. The second electrostatic dispersion lines 176b and 178b is spaced apart from the first electrostatic dispersion lines 176a and 178a.

The first and second electrostatic dispersion lines 176a, 178a, 176b, and 178b are connected to an electrical shorting bar formed on the motherboard for a display substrate. The first and second electrostatic dispersion lines 176a, 178a, 176b, and 178b disperse electric charges flowing into the motherboard by using the electrical shorting bar so that the electric charges may be dispersed into the overall motherboard. The first and second electrostatic dispersion lines 176a, 178a, 176b, and 178b are separated from the electrical shorting bar by a process of cutting the motherboard by a unit display substrate, while remaining on the motherboard. A cutting line formed on the motherboard overlaps an end of the base substrate 110. Accordingly, the first and second electrostatic dispersion lines 176a, 178a, 176b, and 178b are extended to reach the end of the base substrate 110.

The display substrate 100 according to an exemplary embodiment of the present invention may include more than four pads and electrostatic dispersion lines connected to the pads.

Figure 3:
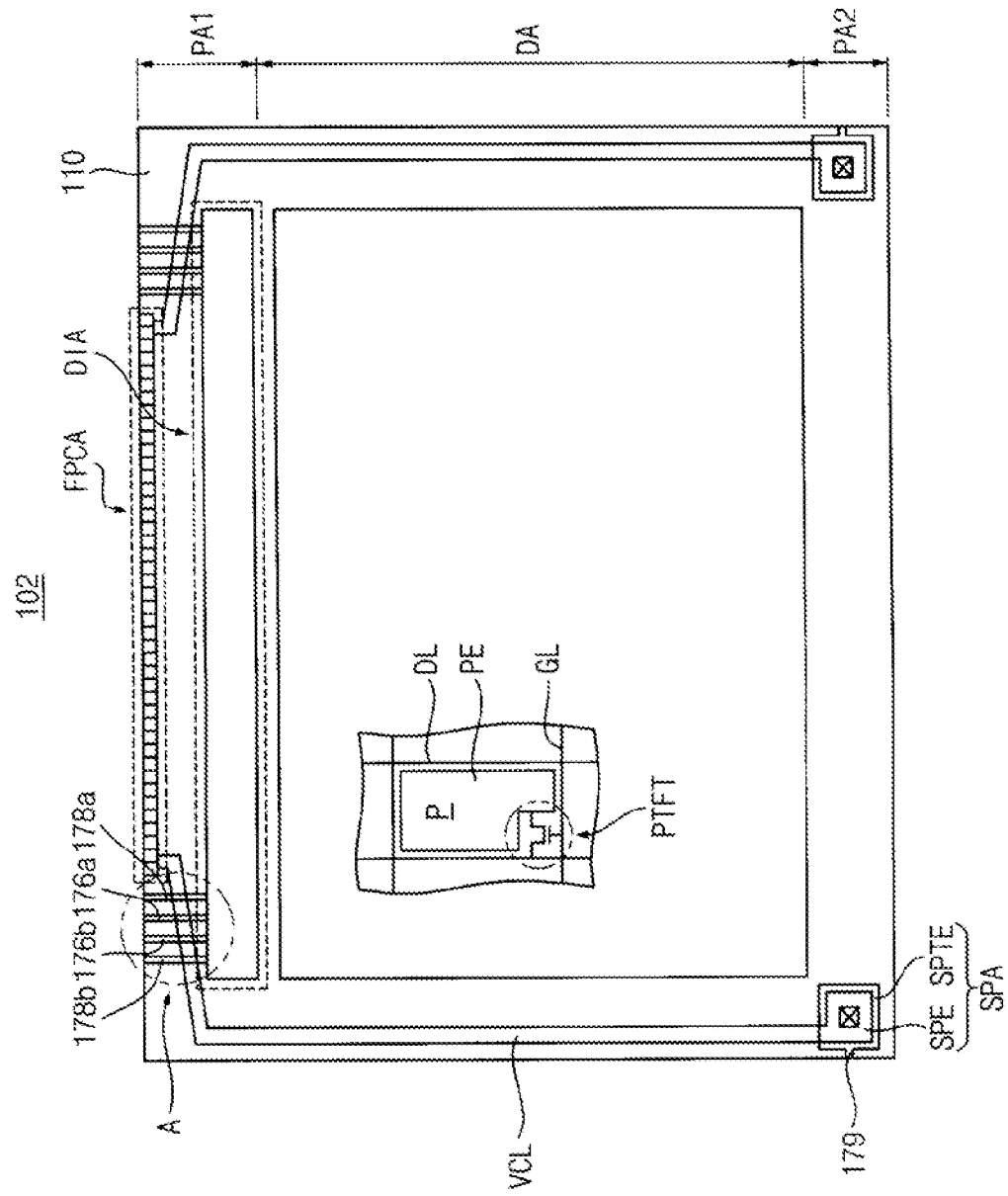
FIG. 3 is a plan view illustrating a display substrate according to an exemplary embodiment of the present invention.

FIG. 3 is a plan view illustrating a display substrate according to an exemplary embodiment of the present invention.

Referring to FIG. 3, a display substrate 102 according to an exemplary embodiment of the present invention includes a base substrate 110. The base substrate 110 includes a display area DA, a first peripheral area PA1 and a second peripheral area PA2. An image is displayed in the display area DA. The first and second peripheral areas PA1 and PA2 surround the display area DA. The first and second peripheral areas PA1 and PA2 include a driving chip mounting area DIA and an FPC connection area FPCA.

A gate line GL, a data line DL, a pixel switching element PTFT, and a pixel electrode PE are formed in the display area DA. The gate line GL crosses the data line DL. The display area DA includes a plurality of pixel regions P.

IC pads (not shown) electrically connected to a driving chip (not shown), a test switch (not shown) for performing a VI process, a test signal line (not shown) connected to the test switch, and a driving signal line (not shown) are formed in the driving chip mounting area DIA. FPC pads (not shown) electrically connected to metal terminals of a flexible printed circuit board (not shown) is formed in the FPC connection area FPCA. First electrostatic dispersion lines 176a and 178a and second electrostatic lines 176b and 178b are formed in the first peripheral area PA1. The first electrostatic dispersion lines 176a and 178a are extended from the driving chip mounting area DIA to an end of the base substrate 110. The second electrostatic dispersion lines 176b and 178b are substantially parallel with the first electrostatic lines 176a and 178a and extended to reach the end of the base substrate 110.

A voltage applier SPA and a third electrostatic dispersion line 179 are formed in the second peripheral area PA2. The voltage applier SPA includes a voltage electrode SPE and a voltage pad electrode SPTE formed on the voltage electrode SPE and electrically connected to the voltage electrode SPE. The third electrostatic dispersion line 179 is extended from the voltage applier SPA to an end of the base substrate 110. In an exemplary embodiment, the end of the base substrate 110 may be a first side substantially perpendicular to a second side of the base substrate 110 to which the first and second electrostatic dispersion lines 176a, 178a, 176b, and 178b are extended.

A common voltage line VCL extended from the voltage applier SPA to the first peripheral area PA1 is formed between the first peripheral area PA1 and the second peripheral area PA2. The common voltage line VCL is extended along an outline of the display area DA. The common voltage line VCL may be electrically connected to the FPC pads. The common voltage line VCL is extended along an outline of the display area DA to apply a common voltage signal to the display area DA. The common voltage line VCL overlaps the first and second electrostatic dispersion lines 176a, 178a, 176b, and 178b.

The first and second electrostatic dispersion lines 176a, 178a, 176b, and 178b are connected to an electrical shorting bar (not shown) formed on a motherboard for a display substrate. The first and second electrostatic in dispersion lines 176a, 178a, 176b, and 178b are separated from the electrical shorting bar to remain in the display substrate 102 by a process of cutting the motherboard. Fourth electrostatic dispersion lines (not shown) connected to the FPC pads may be formed in the FPC connection area FPCA. The fourth electrostatic dispersion lines may be connected to the electrical shorting bar with the first and second electrostatic dispersion lines 176a, 178a, 176b, and 178b. The fourth electrostatic dispersion lines may be separated from the electrical shorting bar to remain in the display substrate 102 by the process of cutting the motherboard.

Figure 4:
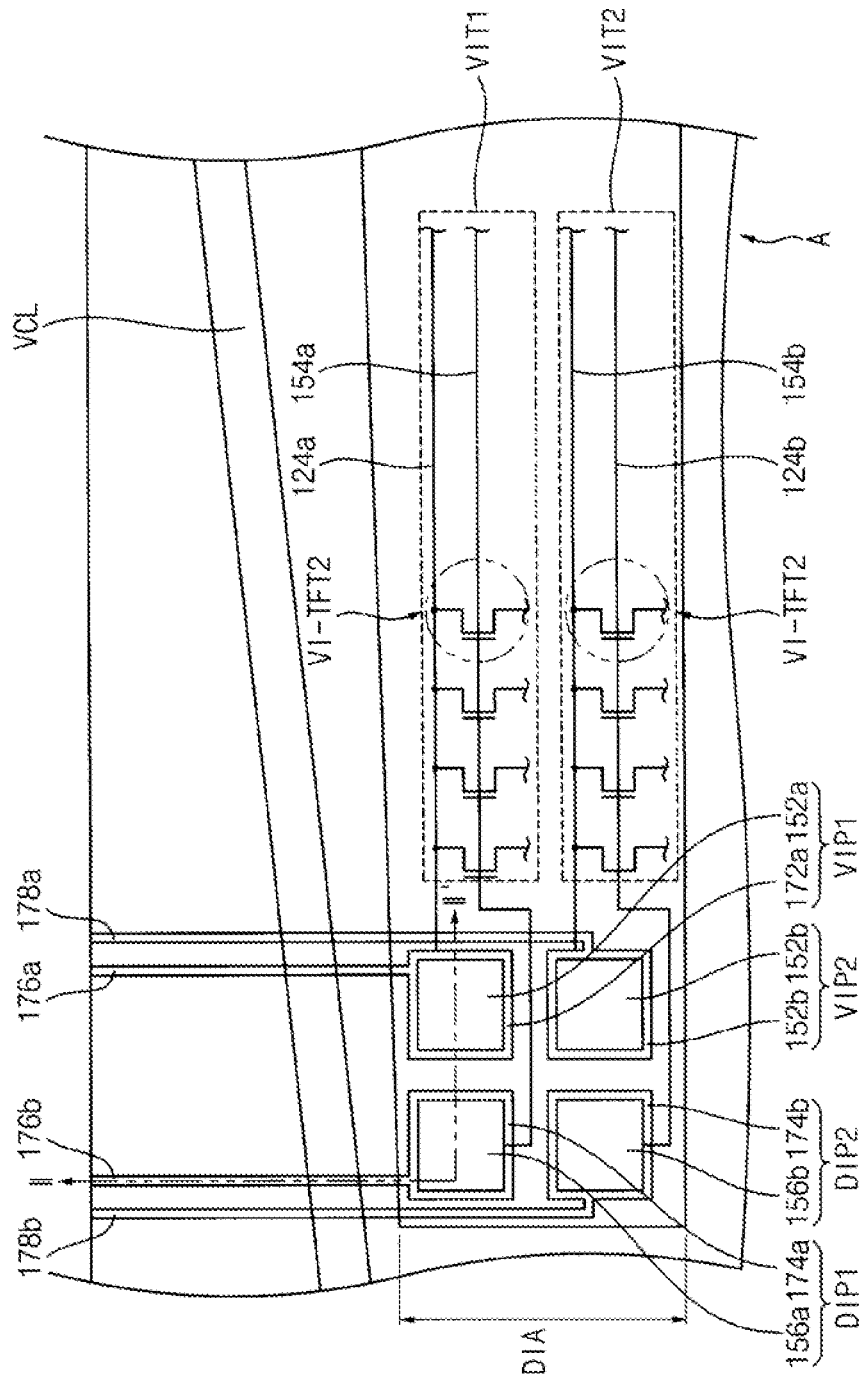
FIG. 4 is an enlarged plan view illustrating a region 'A' shown in FIG. 3.
Figure 5:
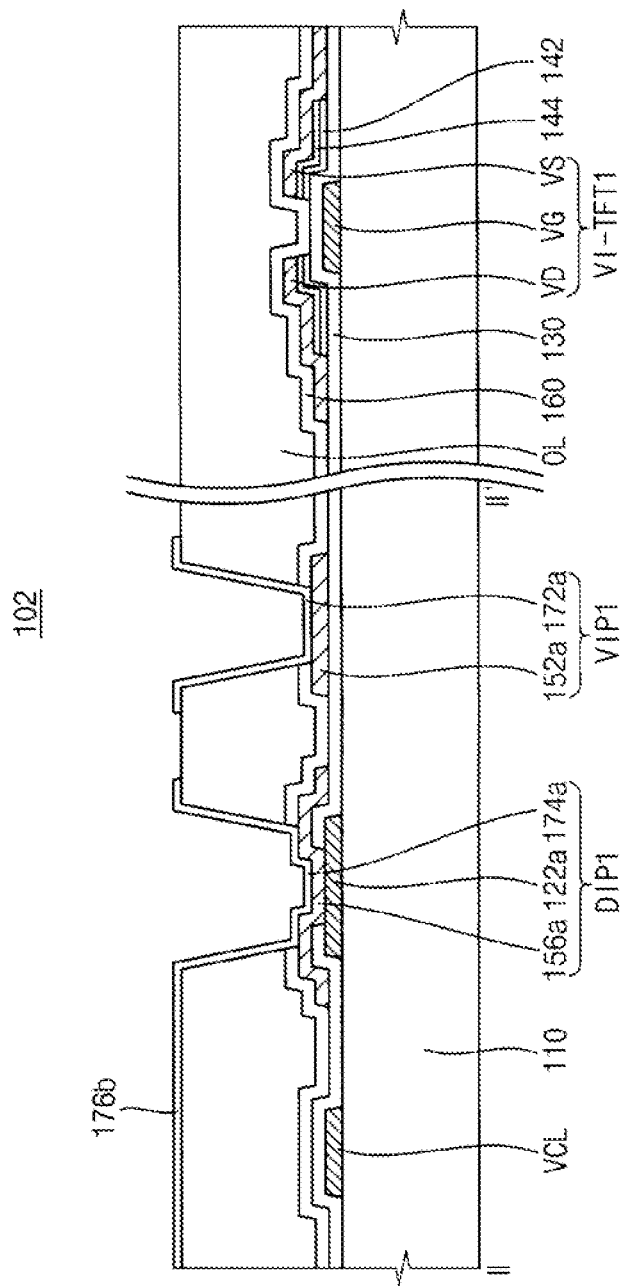
FIG. 5 is a cross-sectional view taken along a line II-II' shown in FIG. 4.

FIG. 4 is an enlarged plan view illustrating a region 'A' shown in FIG. 3. FIG. 5 is a cross-sectional view taken along a line II-II' shown in FIG. 4.

Referring to FIGS. 4 and 5, a first test switch VIT1, a second test switch VIT2, a first test signal line 154a, a second test signal line 154b, a first driving signal line 124a, a second driving signal line 124b, a first test pad VIP1, a second test pad VIP2, a first driving pad DIP1, and a second driving pad DIP2 are formed in the driving chip mounting area DIA. The first electrostatic dispersion lines 176a and 178a are respectively connected to the first test pad VIP1 and the second test pad VIP2. The second electrostatic dispersion lines 176b and 178b are respectively connected to the first driving pad DIP1 and the second driving pad DIP2.

After the VI process is performed, the first and second test pads VIT1 and VIT2 remain turned-off. The driving chip is mounted in the driving chip mounting area DIA including the turned-off first and second test switches VIT1 and VIT2 formed therein.

The first test switch VIT1 includes first test switching elements VI-TFT1 connected to the first test signal line 154a and the first driving signal line 124a. The second test switch VIT2 includes second test switching elements VI-TFT2 connected to the second test signal line 154b and the second driving signal line 124b. The first test switching element VI-TFT1 includes a gate electrode VG, a source electrode VS formed on the gate electrode GE and a drain electrode formed on the gate electrode GE.

The first test pad VIP1 is connected to the first test signal line 154a. The first test pad VIP1 includes a first test electrode 152a and a first test pad electrode 172a. The first test electrode 152a is connected to the first test signal line 154a. The test pad electrode 172a is electrically connected to the first test electrode 152a. The first test pad electrode 172a is connected to a first line of the first electrostatic dispersion lines 176a. The second test pad VIP2 is connected to the second test signal line 154b. The second test pad VIP2 includes a second test electrode VIP2 and a second test pad electrode 172b. The second test electrode VIP2 is connected to the second test signal line 154b. The second test pad electrode 172b is electrically connected to the second test electrode 152b. The second test pad electrode 172b is connected to a second line of the first electrostatic dispersion lines 178a. The first electrostatic dispersion lines 176a and 178a overlap a portion of the common voltage line VCL.

The first driving pad DIP1 is connected to the first driving signal line 124a. The first driving pad DIP1 includes a first driving electrode 122a, a first source metal pattern 156a and a first driving pad electrode 174a. The first driving electrode 122a is connected to the first driving signal line 124a. The first source metal pattern 156a is formed on the first driving electrode 122a. The first driving pad electrode 174a is in contact with the first source metal pattern 156a to be electrically connected to the first driving electrode 122a. The first driving pad electrode 174a is connected to the first line of the second electrostatic dispersion lines 176b. The second driving pad DIP2 is connected to the second driving signal line 124b. The second driving pad includes a second driving electrode (not shown), a second source metal pattern 156b and a second driving pad electrode 174b. The second driving electrode is connected to the second driving signal line 124b. The second source metal pattern 156b is formed on the second driving electrode. The second driving pad electrode 174b is in contact with the second source metal pattern 156b to be electrically connected to the second driving electrode. The second driving pad electrode 174b is connected to the second line of the second electrostatic dispersion lines 178a. The second electrostatic dispersion lines 176b and 178b overlap a portion of the common voltage line VCL.

The display substrate 102 includes a gate insulating layer 130, a semiconductor layer 142, an ohmic contact layer 144 a passivation layer 160 and an organic layer OL. The gate insulating layer 130 is formed on the gate electrode VG. The semiconductor layer 142 and the ohmic contact layer 144 are sequentially formed on the gate insulating layer 130 corresponding to the gate electrode VG. The passivation layer 160 is formed on the source and drain electrodes VS and VG. The organic layer OL is formed on the passivation layer 160.

The organic layer OL is formed in the display area DA and the first and second peripheral areas PA1 and PA2 and covers the first and second test switches VIT1 and VIT2. The organic layer OL includes holes formed therethrough. The holes expose the first source metal pattern 156a and the first test electrode 152a, respectively. The first source metal pattern 156a is electrically connected to the first driving pad electrode 174a through the hole. The first test electrode 152a is electrically connected to the first test pad electrode 172a through the hole.

The first and second electrostatic dispersion lines 176a, 178a, 176b, and 178b are formed on a portion of the organic layer OL which is formed in the first peripheral area PA1. A first thickness of a first portion of the organic layer OL formed in the first peripheral area PA1 may be the same as a thickness of a second portion of the organic layer OL formed in the display area DA. In an exemplary embodiment, the thickness of the first portion of the organic layer OL formed in the first peripheral area PA1 may be smaller than the thickness of the second portion of the organic layer OL formed in the display area DA.

The first and second electrostatic dispersion lines 176a, 178a, 176b, and 178b are connected to an electrical shorting bar of a motherboard for a display substrate. In an exemplary embodiment, the first and second electrostatic dispersion lines 176a, 178a, 176b, and 178b will be separated from the electrical shorting bar of the motherboard to remain on the display substrate 102. The first and second electrostatic dispersion lines 176a, 178a, 176b, and 178b connected to the electrical shorting bar disperse electric charges applied from the test pads VIP1 and VIP2 and the driving pads DIP1 and DIP2 into the motherboard for a display substrate so that the electric charges may be dispersed into the overall motherboard. Therefore, damages caused by the static electricity may be prevented.

When the organic layer OL is formed in the first peripheral area PA1 of the display substrate 102, the distance between two of the first and second electrostatic dispersion lines 176a, 178a, 176b, and 178b may increase. Accordingly, the organic layer OL may minimize coupling among the common voltage signal applied to the common voltage line VCL during the VI process, gate pad signals applied by the test pads VIP1 and VIP2 and the driving pads DIP1 and DIP2, and data test signals when the common voltage line VCL overlaps the first and second electrostatic dispersion lines 176a, 178a, 176b, and 178b.

When the organic layer OL is formed on the passivation layer 160, the passivation layer 160 and the organic layer OL may cover the source and drain electrodes of each of the test switching elements. Accordingly, static electricity generated by the electric charges flowing from the exterior is prevented, and damage of the test switching elements generated by static electricity may be prevented.

FIGS. 6A to 9B are plan views and cross-sectional views illustrating a method of manufacturing a motherboard for a display substrate according to an exemplary embodiment of the present invention.

Referring to FIGS. 6A to 9B, a motherboard 200 for a display substrate includes a base motherboard 210. The base motherboard 210 includes a plurality of array areas AA and a plurality of outer areas SA. An array layer is formed in the array area AA. The outer area SA is formed between adjacent array areas AA.

Each of the array areas AA includes a display area DA and a peripheral area PA. An image displayed on the display area DA. The peripheral area PA surrounds the display area DA. The array layer includes a gate line (not shown), a data line, test signal lines, driving signal lines, and a voltage electrode SPE. The gate line and the data line are formed in the display area DA. The data line crosses the gate line. The display area DA includes a plurality of pixel regions. The test signal lines, the driving signal lines and the voltage electrode SPE are formed in the peripheral area PA.

The base motherboard 210 is cut to form a plurality of display substrates 100 corresponding to the array areas AA through a process of cutting the base motherboard by an array area AA. The base motherboard 210 includes a first cutting line CL1 and a second cutting line CL2. The first cutting line CL1 is extended in the first direction. The second cutting line CL2 is extended in a second direction substantially perpendicular to the first direction. The motherboard for a display substrate is cut along the first and second cutting lines CL1 and CL2 which are virtual lines.

Figure 6A:
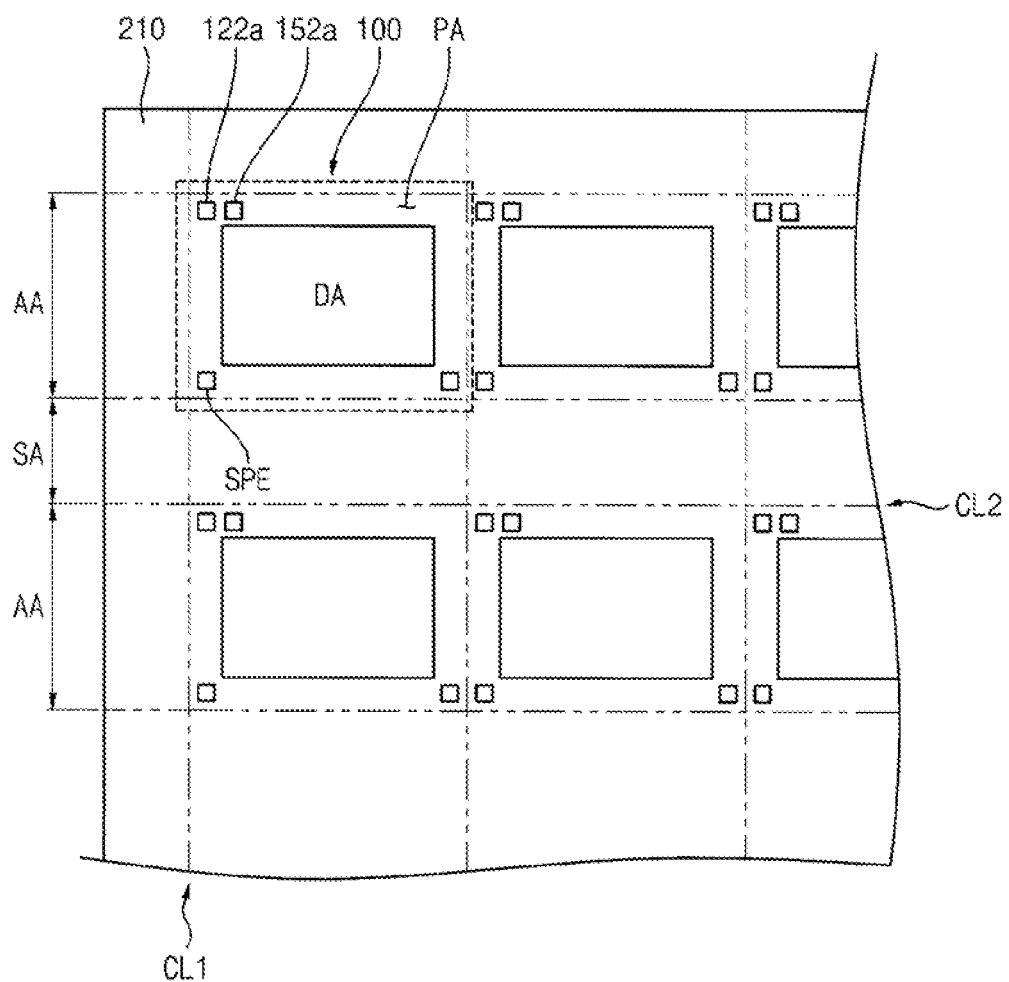
FIGS. 6A to 9 are plan views and cross-sectional views illustrating a method of manufacturing a motherboard for a display substrate according to an exemplary embodiment of the present invention.
Figure 6B:
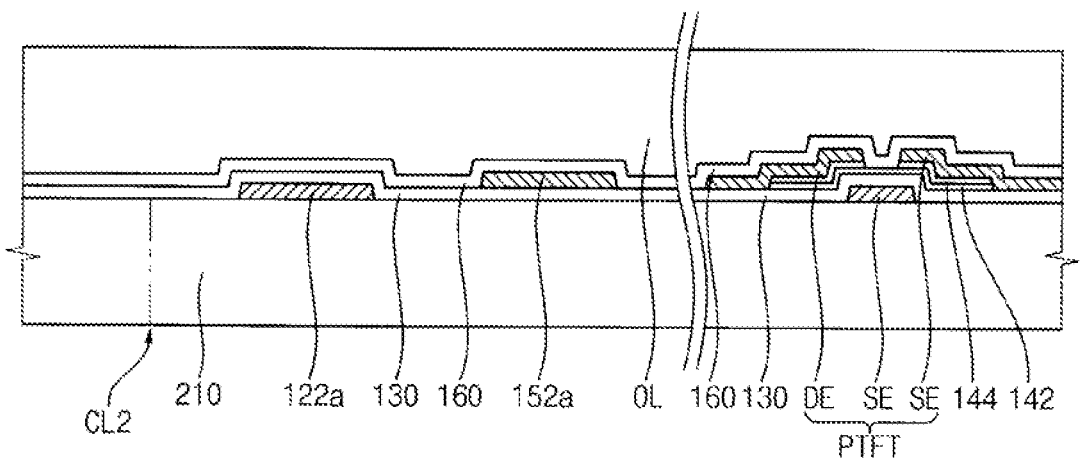

Referring to FIG. 6B, a gate metal layer (not shown) is formed on the base motherboard 210, and the gate metal pattern is patterned to form a gate pattern. The gate pattern includes the gate electrode GE of the pixel switching element PTFT and the first test electrode 122a connected to the first test signal line.

A gate insulating layer 130 is formed on the base motherboard 210 having the gate pattern formed thereon. For example, the gate insulating layer 130 may include silicon nitride (SiNx).

After a semiconductor layer 142 and an ohmic contact layer 144 are sequentially formed on the base motherboard 210 having the gate insulating layer 130, the semiconductor layer 142 and the ohmic contact layer 144 are patterned. In an exemplary embodiment, the semiconductor layer 142 and the ohmic contact layer 144 are formed on the gate insulating layer 130 to overlap the gate electrode GE.

A source metal layer (not shown) is formed on the base motherboard 210. The source metal layer is patterned to form a source pattern. The source pattern includes a source electrode SE of the pixel switching element PTFT a drain electrode DE spaced apart from the source electrode SE and the first driving electrode 152a connected to the first driving signal line. The source electrode SE and the drain electrode DE is formed on the semiconductor layer 142 and the ohmic contact layer 144, and overlaps the gate electrode GE.

A passivation layer 160 is formed on the base motherboard having the source pattern formed thereon. For example, the passivation layer 160 may include silicon nitride (SiNx). An organic layer OL is formed on the base motherboard 210 having the passivation layer 160 formed thereon.

Figure 7A:
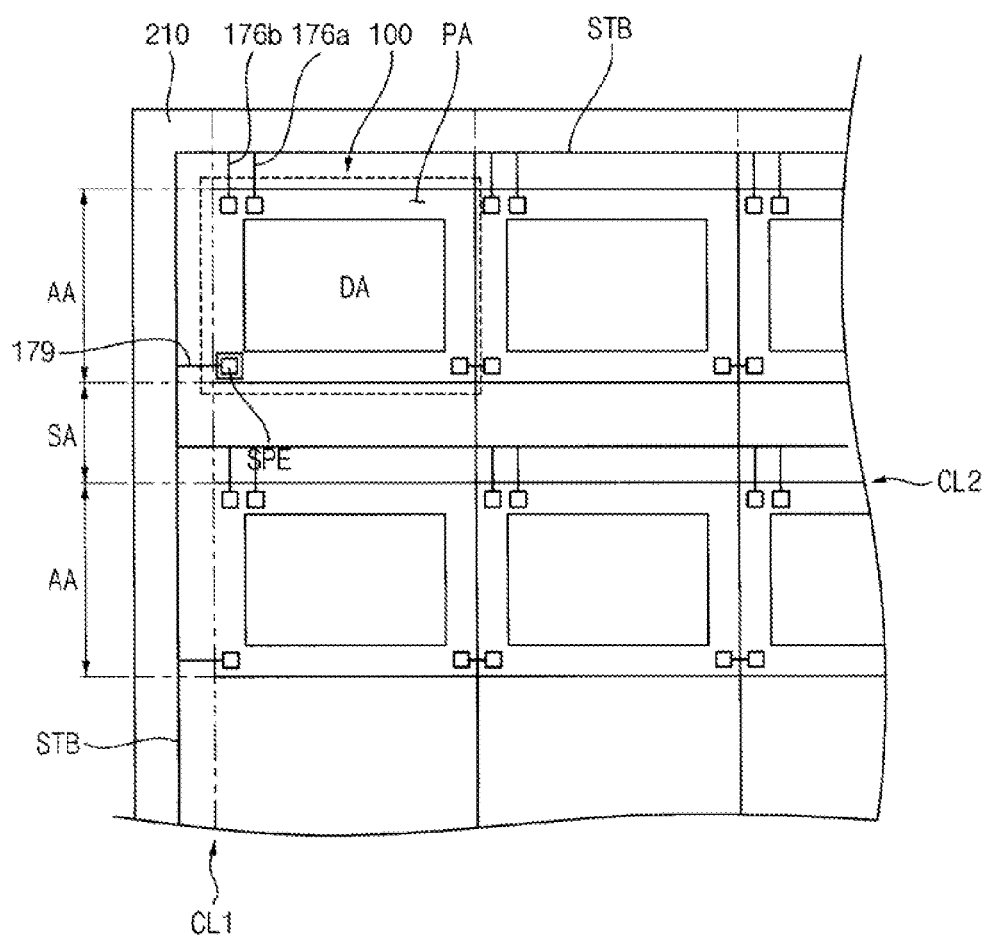
Figure 7B:
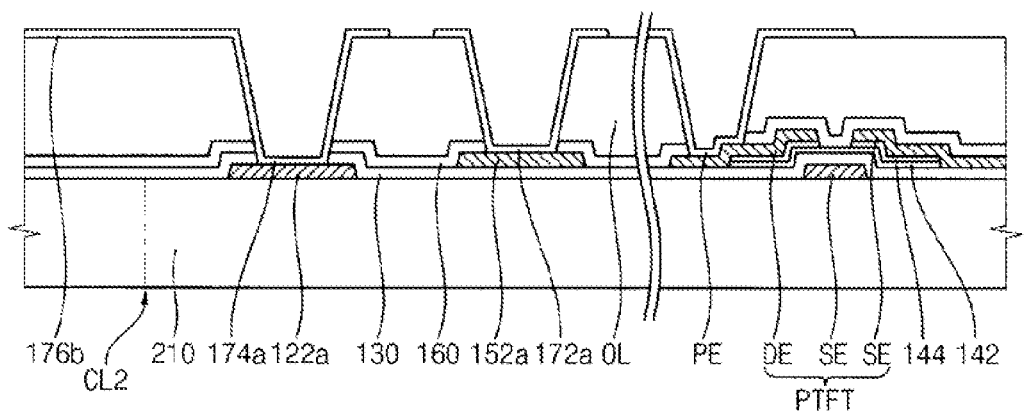

Referring to FIGS. 7A and 7B, a portion of the organic layer OL and a portion of the passivation layer 160, which are formed on the drain electrode DE and the first signal electrode 152a, are removed. A portion of the organic layer OL, a portion of the passivation layer 160 and a portion of the gate insulating layer 130, which are formed on the first driving electrode 122a, are removed. Accordingly, an end of the drain electrode DE is exposed and holes exposing the first signal electrode 152a and the first driving electrode 122a are formed.

Figure 7C:
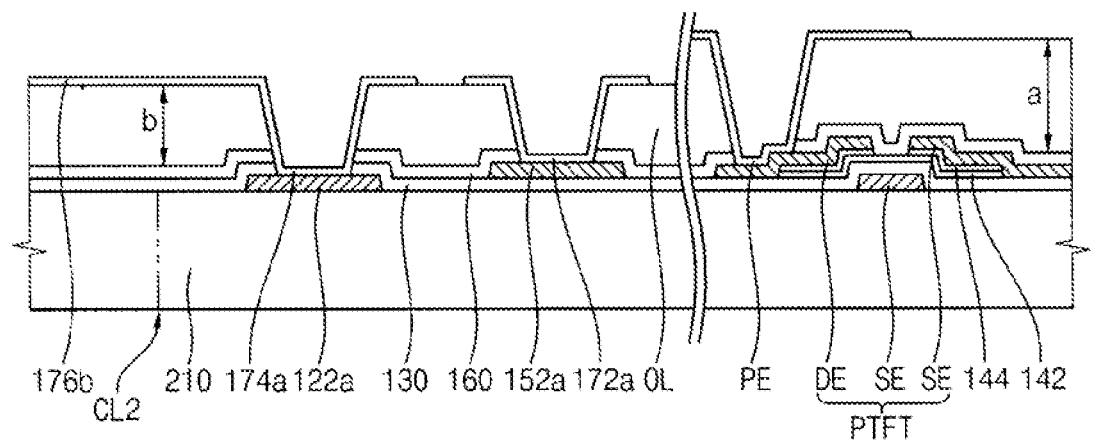

Referring to FIG. 7C, the organic layer may include a first thickness portion having a first thickness 'a' and a second thickness portion having a second thickness 'b'. The first thickness portion is formed in the display area DA. The second thickness is formed in the peripheral area PA. The first thickness 'a' may be larger than the second thickness 'b'. For example, light irradiated onto a first port on of the organic layer OL is blocked so that the first thickness portion may be formed and light irradiated onto a second portion of the organic layer OL is partially blocked so that the second thickness portion may be formed. The first thickness 'a' may be substantially the same as the thickness of an initial organic layer and the second thickness 'b' may be smaller than the thickness of the initial organic layer.

A transparent electrode layer (not shown) is formed on the base motherboard 210 having the organic layer OL formed thereon. The organic layer OL includes holes formed therethrough. The transparent electrode layer in may include a transparent conductive material. For example, the transparent electrode layer may include indium zinc oxide (IZO) or indium tin oxide (ITO).

Referring to FIGS. 7A to 8B, the transparent electrode layer is patterned to form a pixel electrode PE, an electrical shorting bar STB, a first signal pad electrode 172a, a first driving pad electrode 174a, a first electrostatic dispersion line 176a, and a second electrostatic dispersion line 176b. The pixel electrode PE is connected to the pixel switching element PTFT. The electrical shorting bar STB is formed in the outer area SA and surrounds each array area AA. The first signal pad electrode 172a is in contact with the first signal electrode 152a. The first driving pad electrode 174a, the first electrostatic dispersion line 176a and the second electrostatic dispersion line 176b are in contact with the first driving electrode 122a. The first and second electrostatic dispersion lines 176a and 176b may be formed through a process of forming the electrical shorting bar. Therefore, manufacturing costs may be reduced and manufacturing processes may be simplified.

The first electrostatic dispersion line 176a is connected to the first signal pad electrode 172a. The first electrostatic dispersion line 176a connects the first signal pad electrode 172a to the electrical shorting bar STB. The second electrostatic dispersion line 176b is connected to the first driving pad electrode 174a. The second electrostatic dispersion line 176b connects the first driving pad electrode 176a to the electrical shorting bar STB. In exemplary embodiment, the first and second electrostatic dispersion lines 176a and 176b may be connected to the electrical shorting bar STB substantially parallel with the second cutting line CL2.

The transparent electrode layer is patterned to further form a voltage pad electrode SPTE and a third electrostatic dispersion line 179 which are electrically connected to the voltage electrode SPE. The third electrostatic dispersion line 179 is connected to the voltage pad electrode SPTE. The third electrostatic dispersion line 179 connects the voltage pad electrode SPTE to the electrical shorting bar STB. In an exemplary embodiment, the third electrostatic dispersion line 179 may be substantially parallel with the first cutting line CL1 or connected to the electrical shorting bar overlapping the first cutting line CL1.

Figure 8A:
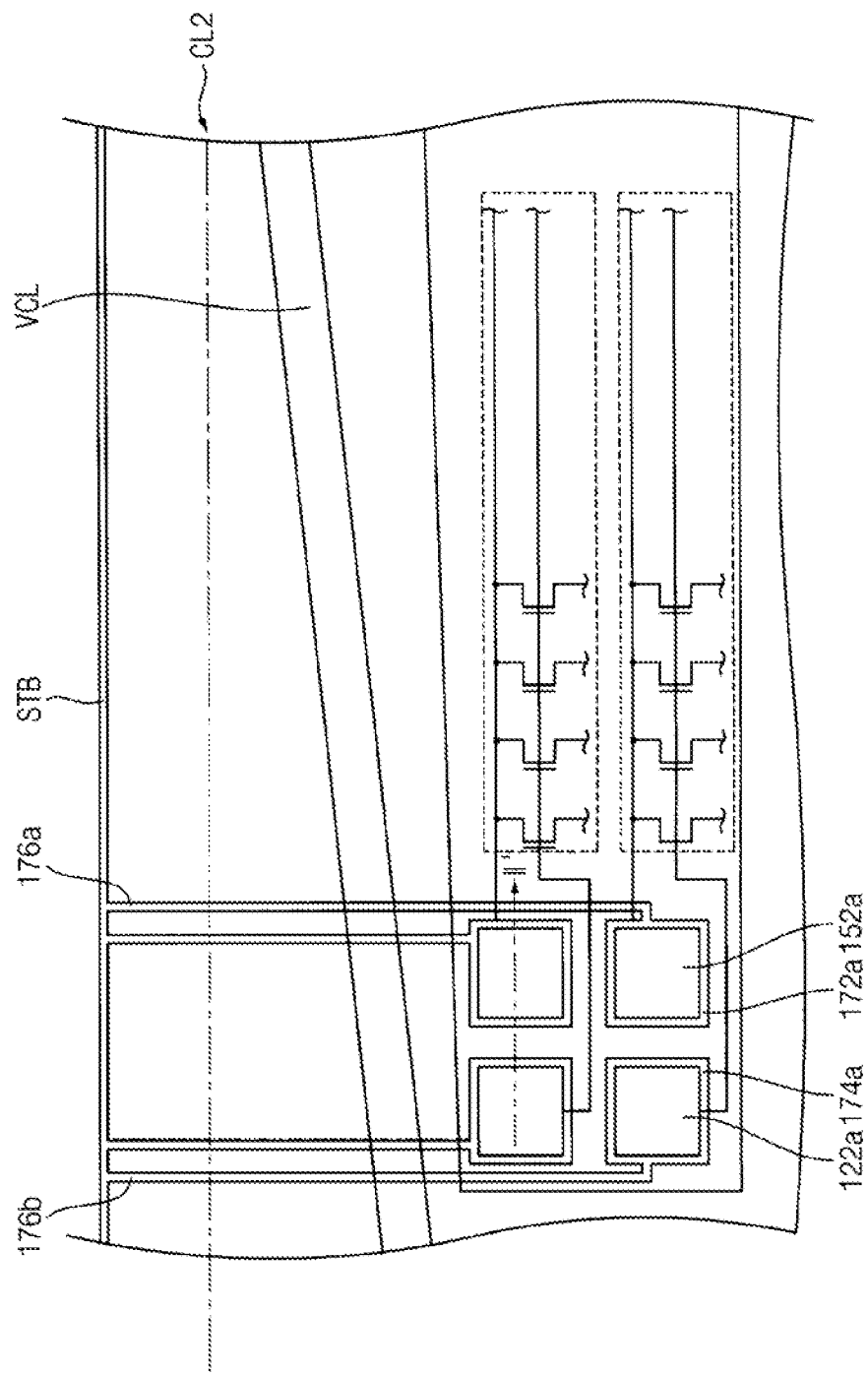
Figure 8B:
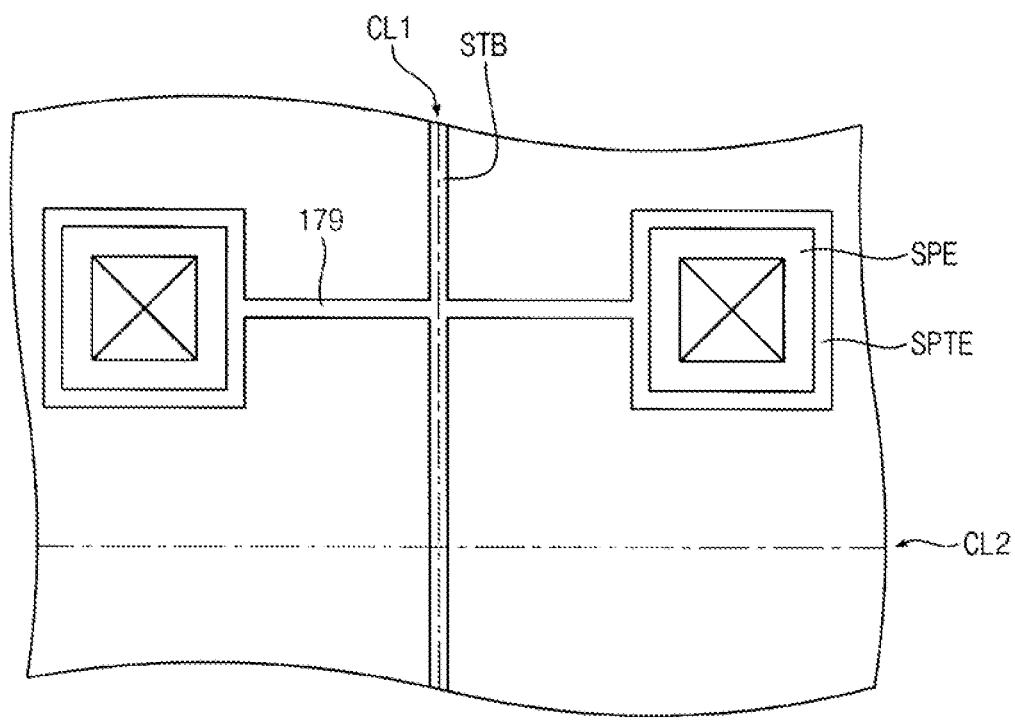

Referring to FIG. 8A, a common voltage line VCL electrically connected to the voltage electrode SPE is formed in the peripheral area PA. In an exemplary embodiment, the gate metal layer may be patterned to form the common voltage line VCL. The organic layer OL is formed on the common voltage line VCL. The first and second electrostatic dispersion lines 176a and 176b are formed on the organic layer OL.

Referring again to FIGS. 6A and 5, in an exemplary embodiment of the present invention, the gate insulating layer 130 is formed on the first driving electrode 122a, and the gate insulating layer 130 is etched to form a hole exposing the first driving electrode 122a so that the first driving pad DIP1 is formed. The source metal layer is formed on the base motherboard 210 having the gate insulating layer 130 formed thereon. The gate insulating layer 130 includes the hole formed therethrough. The source metal layer is patterned to form a first source metal pattern 156a. The first driving electrode 122a is connected to the first source metal pattern 156a through the hole formed through the gate insulating layer 130. As shown in FIG. 6A, the passivation layer 160 and the organic layer OL are sequentially formed on the base motherboard 210 having the first source metal pattern 156a. A portion of the organic layer OL and a portion of the passivation layer 160 formed on the first source metal pattern 156a are etched so that the first source metal pattern is exposed. A portion of the transparent electrode layer formed on the organic layer OL is patterned so that the first driving pad electrode 174a, the second electrostatic dispersion line 176b and the electrical shorting bar STB are formed. The first driving pad electrode 174a is in contact with the first source metal pattern 156a. The second electrostatic dispersion line 176b and the electrical shorting bar STB are connected to the first driving pad electrode 174a.

A method of manufacturing a motherboard 200 for a display substrate may further include a step of forming an alignment layer on the base motherboard 210 having the patterned transparent electrode layer formed thereon. The alignment layer may be formed through a rubbing process during which a polymer layer including polyimide (PI) is rubbed by a rubbing cloth. In an exemplary embodiment, the alignment layer may be formed through a printing method during which the base motherboard 200 may be printed by a printer having alignment patterns.

During the rubbing process, the motherboard 200 for a display substrate and the rubbing cloth may be electrified by friction between the motherboard 200 for a display substrate and the rubbing cloth. During the printing method, the motherboard 200 for a display substrate and the printer may be electrified by friction between the motherboard 200 for a display substrate and the printer. Accordingly, charges accumulated in the rubbing cloth or the printer are discharged into the motherboard 200 for a display substrate and flow into the motherboard 200 for a display substrate through the first test pad electrode 172a and the first driving pad electrode 174a. The charges may further flow into the motherboard 200 for a display substrate through the voltage pad electrode SPTE. The first second and third electrostatic dispersion lines 176a, 176b and 179 disperse the charges into the overall motherboard 200 for a display substrate by using the electrical shorting bar STB. Accordingly, concentration of the charges on a certain portion of the motherboard 200 to form static electricity may be prevented.

Then, the motherboard 200 for a display substrate having the alignment layer formed thereon is combined with a motherboard (not shown) for a color filter substrate having color filters formed thereon. The motherboard 200 for the display substrate and the motherboard for the color filter substrate combined with each other are cut by a unit display cell.

Figure 9:
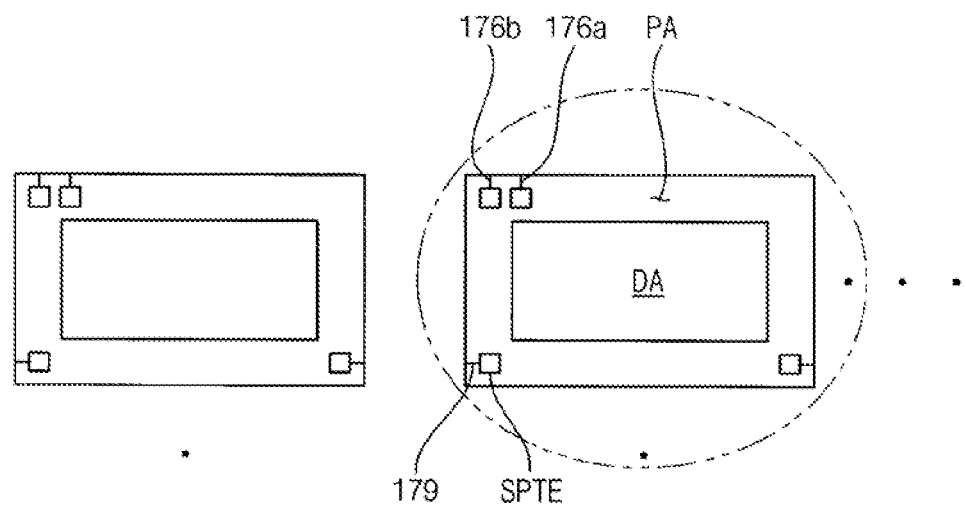

Referring to FIG. 9, the display cell includes a display substrate 100 separated from the motherboard 200 for a display substrate. The display substrate 100 includes the first electrostatic dispersion line 176a, the second electrostatic dispersion line 176b and the third electrostatic dispersion line 179 which are formed in the peripheral area PA.

According to the display substrate and the method of manufacturing the motherboard for the display substrate, the first electrostatic dispersion lines formed in the peripheral area may connect the test pad electrode of the test pad with the electrical shorting bar. The electrical shorting bar may disperse the electric charges inflowing from the test pad into a large area to prevent static electricity from being generated. The organic layer formed in the peripheral area protects the test switch from the static electricity and minimizes interference between the test signals applied to the test pad and the common voltage signals applied to the common voltage lines. Accordingly, the motherboard for a display substrate may be prevented from being damaged by the static electricity so that reliability of products and manufacturing processes may be improved.

Although the exemplary embodiments of the present invention have been described herein with reference with the accompanying drawings, it is understood that the present invention is not be limited to these exemplary embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A display substrate comprising:
   a signal line formed in a display area of a base substrate;
   a test switch formed in a peripheral area of the base substrate, wherein the peripheral area surrounds the display area, and the test switch applies a test signal to the signal line;
   a test pad electrically connected to the test switch, wherein the test pad receives the test signal;
   a first electrostatic dispersion line extended from the test pad to an edge of the base substrate;
   a test signal line connected to the test switch to apply the test signal to the test switch, wherein the test signal line is extended from the test pad;
   an organic layer formed in the display area and the peripheral area to cover the signal line and the test switch; and
   a common voltage line formed on the organic layer and formed in the peripheral area of the base substrate, wherein the common voltage line transmits a common voltage signal to the display area, and wherein the test pad is directly connected to the test switch by the test signal line.

2. The display substrate of claim 1, wherein the test pad comprises:
   a test electrode connected to the test signal line; and
   a test pad electrode electrically connected to the test electrode.

3. The display substrate of claim 2, wherein the first electrostatic dispersion line is formed of substantially the same metal layer as the test pad electrode and connected to the test pad electrode.

4. The display substrate of claim 1, further comprising:
   a driving signal line electrically connected to the test switch to apply a driving signal to the test switch;
   a driving pad connected to the driving signal line to receive the driving signal; and
   a second electrostatic dispersion line extended from the driving pad to the edge of the base substrate.

5. The display substrate of claim 4, wherein the driving pad comprises:
   a driving electrode connected to the driving signal line; and
   a driving pad electrode electrically connected to the driving electrode.

6. The display substrate of claim 5, wherein the second electrostatic dispersion line is formed of substantially the same metal layer as the driving pad electrode to connect the driving pad electrode.

7. The display substrate of claim 6, wherein the second electrostatic dispersion line is formed of substantially the same metal layer as the first electrostatic dispersion line and spaced apart from the first electrostatic dispersion line.

8. The display substrate of claim 1, further comprising:
   a voltage pad connected to the common voltage line; and
   a third electrostatic dispersion line connected to the voltage pad, wherein the third electrostatic dispersion line is formed on the organic layer and extended to reach the edge of the base substrate.

9. The display substrate of claim 8, wherein the voltage pad comprises:
   a voltage electrode electrically connected to the common voltage line; and
   a voltage pad electrode including a transparent material, wherein the voltage pad electrode is formed on the voltage electrode and connected to the third electrostatic dispersion line.

10. The display substrate of claim 1, further comprising an organic layer formed in the display area and the peripheral area to cover the signal line and the test switch.

11. The display substrate of claim 10, wherein the first electrostatic dispersion line is formed on the organic layer corresponding to the peripheral area.

12. A display substrate comprising:
   a test electrode disposed in a peripheral area of a base substrate, wherein the peripheral area surrounds a display area;
   a test signal line connected to the test electrode;
   an electrostatic dispersion line electrically connected to the test electrode in the peripheral area of the base substrate;
   an organic layer formed in the display area and the peripheral area to cover the signal line and the test switch; and
   a common voltage line formed on the organic layer and formed in the peripheral area of the base substrate,
   wherein the common voltage line transmits a common voltage signal to the display area, wherein the electrostatic dispersion line is extended from the test electrode to an edge of the base substrate, wherein the electrostatic dispersion line includes a different layer from the test electrode, wherein the test signal line is connected to a test switch to apply a test signal to the test switch, and wherein the test electrode is directly connected to the test switch by the test signal line.

13. The display substrate of claim 12, wherein the test signal line and the electrostatic dispersion line are extended in different directions.

14. The display substrate of claim 12, further comprising a test pad electrode electrically connected to the test electrode, wherein the test pad electrode overlaps the test electrode.

15. The display substrate of claim 14, wherein the test pad electrode includes a transparent material.

16. The display substrate of claim 14, wherein the electrostatic dispersion line is connected to the test pad electrode.

17. The display substrate of claim 15, wherein the test pad electrode includes substantially the same layer as the electrostatic dispersion line.

18. The display substrate of claim 12, wherein the test signal line is extended from the test electrode.

19. The display substrate of claim 12, wherein the electrostatic dispersion line includes a transparent material.

* * * * *